(12) United States Patent
Stone (10) Patent No.: US 11,936,149 B1
(45) Date of Patent: Mar. 19, 2024

(54) FLANGE TAB APPARATUS AND METHODS OF USE

(71) Applicant: POWERS CORROSION INC., Vulcan (CA)

(72) Inventor: Christien Robert Stone, Vulcan (CA)

(73) Assignee: POWERS CORROSION INC., Vulcan (CA)

( * ) Notice: Subject to any disclaimer, the term of this patent is extended or adjusted under 35 U.S.C. 154(b) by 0 days.

(21) Appl. No.: 18/554,887

(22) PCT Filed: Apr. 7, 2022

(86) PCT No.: PCT/CA2022/050531
§ 371 (c)(1),
(2) Date: Oct. 11, 2023

(87) PCT Pub. No.: WO2022/217339
PCT Pub. Date: Oct. 20, 2022

Related U.S. Application Data (60) Provisional application No. 63/174,939, filed on Apr. 14, 2021.

(51) Int. Cl.
*H01R 4/30* (2006.01)
*F16L 25/01* (2006.01)
(Continued)

(52) U.S. Cl.
CPC .............. *H01R 4/643* (2013.01); *F16L 25/01* (2013.01); *H01R 4/304* (2013.01); *H01R 43/26* (2013.01)

(58) Field of Classification Search
CPC ........ H01R 4/643; H01R 4/304; H01R 43/26; F16L 25/01
(Continued)

(56) References Cited

U.S. PATENT DOCUMENTS 3,600,784 A * 8/1971 Propst ................... H01R 43/26
29/748
3,627,367 A * 12/1971 Levy ..................... H01R 43/26
29/244
(Continued)

FOREIGN PATENT DOCUMENTS

CN 210576581 U 5/2020
FR 2167726 A1 8/1973

OTHER PUBLICATIONS

International Search Report and Written Opinion for PCT/CA2022/050531, dated Jun. 13, 2022, 7 pages.

*Primary Examiner* — Abdullah A Riyami
*Assistant Examiner* — Vladimir Imas
(74) *Attorney, Agent, or Firm* — Holzer Patel Drennan (57) ABSTRACT

According to the present embodiments, an improved flange tab apparatus and methods of use for establishing electrical continuity between at least two electrically conductive structures are provided. More specifically, the present apparatus may be used to establish electrical continuity between an electrically conductive portion of each electrically conductive structure using a flange tab with an aperture for slidably receiving an electrically conductive portion of a first of the at least two structures and connecting the apparatus thereto, and an electrical lead connector for connecting the apparatus to an electrically conductive portion of a second of the at least two structures. The present apparatus may further comprise at least two concentric discs removably mounted in series within the aperture for selecting the diameter of the aperture and a sealing portion for sealingly engaging the apparatus with the at least two structures.

15 Claims, 5 Drawing Sheets

(51) Int. Cl.
*H01R 4/64* (2006.01)
*H01R 43/26* (2006.01)

(58) Field of Classification Search
USPC .......................................................... 439/801
See application file for complete search history.

(56) References Cited

U.S. PATENT DOCUMENTS

| | | | |
|---|---|---|---|
| 3,958,855 A | 5/1976 | Oakes | |
| 8,490,525 B2 * | 7/2013 | Wilson | B25B 23/1427 |
| | | | 81/475 |
| 9,287,658 B2 * | 3/2016 | Lewin | H01R 13/523 |
| 9,466,916 B2 * | 10/2016 | Li | E21B 17/028 |
| 9,735,520 B2 * | 8/2017 | Davidson, Jr. | H01R 43/20 |
| 9,787,021 B2 * | 10/2017 | Lewin | H01R 4/48 |
| 10,027,074 B2 * | 7/2018 | Gibson | H01R 13/17 |
| 10,164,374 B1 * | 12/2018 | Reed | H01R 12/714 |
| 10,209,460 B2 * | 2/2019 | Tucker | G02B 6/3821 |
| 10,727,630 B2 * | 7/2020 | Schmale | H01R 43/26 |
| 10,886,675 B2 * | 1/2021 | Ketzer | G01R 1/0416 |
| 11,005,212 B2 * | 5/2021 | Watkins | H01R 13/622 |
| 11,040,437 B2 * | 6/2021 | Smith | F16B 1/00 |
| 2012/0178271 A1 * | 7/2012 | Rohrbach | G06F 1/18 |
| | | | 439/39 |
| 2022/0200199 A1 * | 6/2022 | Bowe | H01R 13/6205 |

* cited by examiner

FLANGE TAB APPARATUS AND METHODS OF USE

CROSS-REFERENCE TO RELATED APPLICATIONS

This application claims benefit of priority to U.S. Provisional Patent Application No. 63/174,939 filed Apr. 14, 2021, which is specifically incorporated by reference herein for all that it discloses or teaches.

TECHNICAL FIELD

Embodiments herein relate generally to flange tab apparatuses for establishing electrical continuity between at least two structures such as pipelines and, specifically, to improved flange tab apparatus and methods of use, wherein the apparatus may comprise modified flange tab and electrical lead connectors for connecting the apparatus to the at least two structures.

BACKGROUND

Apparatuses and methodologies for electrical connections are well known in the art. An electrically-conductive structure such as a metal pipeline, storage tank, pier pile, ship or boat hull, offshore oil platform, onshore oil well casing, offshore wind farm foundation, scaffold, assembly of concrete reinforcement bars, or the like may require electrical connectivity between one or more connections located in or about the structure and one or more external connections located in or about a second electrically conductive structure (or any other external connection as may be desired). Such electrical connectivity may be required for cathodic protection, electrical dissipation and grounding, structural sensing and monitoring, and other known purposes. In some applications, for example, a pipeline formed of conductive material such as steel, copper, aluminum, or alloys of the same may require electrical connectivity between the pipeline and an external connection such as an electrical junction assembly, wherein the electrical junction assembly comprises, or is electrically-connected to, a means of cathodic protection, grounding connection, sensor, or any combination thereof. In such applications, electrical connectivity may be achieved by using known apparatuses and methodologies that generally comprise an electrically-conductive flange tab fixed to one or more connections located in or about the structure and one or more external connections. The electrically-conductive flange tab may comprise an aperture through which the apparatus may be bolted or otherwise fastened to a structure in order to electrically connect the structure to the external connection and position the external connection a fixed-distance away from the structure.

Embodiments of one such flange tab apparatus are disclosed in U.S. Pat. No. 10,408,369. Such a flange tab apparatus provides a connection for electrical current flow between a structure such as a pipeline and an external connection. The apparatus is configured to secure a wire to a pipeline for cathodic protection and various other applications and, as outlined in more detail, consists of a plurality of members that are joined together in series.

For example, a first member comprises a pre-sized aperture for bolting or otherwise fastening the apparatus to a structure. The aperture is pre-sized using known methods, which generally comprise milling the first member to form an aperture of fixed diameter before fastening the apparatus to the structure. In most applications, the apparatus must be milled to form an aperture with a fixed diameter that is equal to or greater than the diameter of bolts or other fastening means that are required to traverse the aperture. Such bolts or other fastening means are often components of the structure that cannot be readily exchanged or modified.

The second member comprises external threading and the third member consists of a threaded shaft. The configuration of the second and third members results in an apparatus with two threaded members of varying diameter that are joined together in series. The threading may be used to fasten the apparatus to an external connection such as an electrical junction assembly. Other similar configurations are known in the art, each comprising a generally tapered configuration with larger diameter threading positioned proximal to the first member and smaller diameter threading positioned distal to the first member. Such apparatuses comprise a two-nut system used in conjunction with the third member for fastening an electrical lead or the like to the third member. Both nuts must be independently manipulated to position the electrical lead at the correct position along the third member. The nuts may be configured as locking nuts, which necessitates the generally tapered configuration described above. The electrical lead is generally secured between the two nuts as they are tightened against each other.

The ring member is a component of the fastening means between the apparatus and the external connection that may complement the threading of the second member. It may be configured as a locking nut, which necessitates the generally tapered configuration described above. The ring member is not configured as a seal.

Although known flange tab apparatus may facilitate electrical connectivity, they suffer from several limitations. First, the pre-sized aperture may be unsuitable for structures that comprise bolts or other fastening means with diameters that are greater than or are substantially less than the fixed diameter of the aperture. In such circumstances, a new flange tab apparatus may need to be obtained from a supplier located far away from the worksite or, alternatively, the flange tab apparatus may need to be re-milled at the worksite, requiring specialized tools and skilled labour to be present. In either case, time and expense is required, which is undesirable in hazardous and/or fast-paced work environments.

Second, the generally tapered configuration of the threaded connection may be undesirable because it results in an imperfect connection between the apparatus and the external connection. In some applications, the narrow end of the threaded connection may extend too far and prevent the wider end of the threaded connection from engaging its reciprocal threading in the external connection altogether. In other applications, only a few threads of the threaded connection may be of an appropriate diameter to engage reciprocal threading in the external connection, resulting in a relatively weak connection between the apparatus and the external connection. This imperfect and/or weaker connection may prevent the apparatus from forming a waterproof and explosion proof seal with the external connection. A waterproof seal is desirable to protect reactive and/or electrical components that may be contained within the external connection from harsh weather conditions and underwater environments. An explosion proof seal is desirable to protect nearby structures, humans, and animals from electrical explosions that may cause damage and injury. Furthermore, many jurisdictions have rating systems and regulatory requirements that require electrical connections to meet a certain minimum standard with respect to explosion proofing.

Third, known apparatuses do not comprise a seal, which may also prevent the apparatus from forming a waterproof and explosion proof seal with the external connection.

Fourth, known two-nut systems for fixing an electrical lead or the like to the third member are inconvenient and time-consuming. Both nuts must be manipulated independently in order to correctly position the electrical lead along the third member. In some circumstances where the configuration of the external connection prevents easy access to both nuts, their manipulation may require specialize tools or may be impossible.

Considering the foregoing, there is a need for improved flange tab apparatuses and methods of use that permit aperture diameters to be readily selected at the worksite, allow the apparatuses to be easily connected to an external connection, and are configured to form a waterproof and explosion proof seal with the external connection.

SUMMARY OF INVENTION

According to the present embodiments, improved flange tab apparatuses and methods of use for establishing electrical continuity between at least two electrically conductive structures are disclosed herein. More specifically, the present apparatus and methods of use may be used to establish electrical continuity between an electrically conductive portion of each electrically conductive structure. Namely, the present apparatus may comprise a flange tab with an aperture for slidably receiving an electrically conductive portion of a first of the at least two structures and connecting the apparatus thereto and an electrical lead connector for connecting the apparatus to an electrically conductive portion of a second of the at least two structures. When the apparatus is connected in this manner, electrical current may flow from the first of the at least two structures through the flange tab, to the electrical lead connector, and to the second of the at least two structures, or vice versa.

In some embodiments, the present apparatus may comprise at least two concentric discs removably mounted in series within the aperture, the at least two concentric discs increasing in diameter as the discs progress from a centre disc towards an outer disc adjacent the sidewall of the aperture. The concentric discs may comprise at least one mechanical connector, which may further comprise at least two diametrically opposed mechanical connectors aligned on at least one axis. In such embodiments, each of the at least two concentric discs may be rotatable about one of the at least one axis, wherein rotation of a disc disconnects the opposed mechanical connectors to remove the disc from the apparatus. Section and removal of one or more of the concentric discs serves to selectively increase the diameter of aperture for the purpose of slidably receiving the electrically conductive portion of the first of the at least two structures therein.

In other embodiments, the electrically conductive portion of the second of the at least two structures comprises at least one electrical lead and the electrical lead connector is configured to securely receive the at least one electrical lead. The electrical lead connector may form at least one bolt for threadably receiving one nut to secure the at least one electrical lead.

In yet other embodiments, the apparatus may further comprise at least one sealing portion for sealingly engaging the apparatus with at least one of the first and second of the at least two structures. The sealing portion may comprise at least one annular seal and at least one annular groove for receiving the at least one annual seal.

As will be appreciated, present embodiments are directed to enabling the convenient and rapid selection of aperture diameters for connecting the apparatus to the first of the at least two structures. Present embodiments are further directed to allowing the easy connection of the apparatus to the second of the at least two structures. Present embodiments are yet further directed to provide a waterproof and explosion proof seal between the apparatus and at least one of the at least two structures. Other features and advantages of the present apparatuses and methods of use will be apparent from the following drawings and detailed description.

BRIEF DESCRIPTION OF THE DRAWINGS

FIG. 1 shows side views of the present apparatus adjacent at least one electrically conductive structure, the apparatus shown disconnected from the structure (FIG. 1A), and shown connected to the structure (FIG. 1B), according to embodiments;

FIG. 3 shows magnified side views of a flange tab of the apparatus shown in FIG. 1A, the flange tab shown having all concentric discs mounted therein (FIG. 3A), and shown having two concentric discs removed (i.e., central disc and next adjacent disc; FIG. 3B) according to embodiments;

FIG. 4 shows magnified side views of a lead connector of the apparatus, the lead connector shown disconnected from the structure shown in FIG. 1A (FIG. 4A), and the lead connector shown connected to the structure shown in FIG. 1A (FIG. 4B), according to embodiments;

FIG. 5 shows magnified side views of a sealing portion of the apparatus shown in FIG. 1A, the sealing portion shown in side view (FIG. 5A), in cross section (FIG. 5B), and in perspective view combined with the lead connector (FIG. 5C), according to embodiments;

DETAILED DESCRIPTION OF INVENTION

Reference will now be made to FIGS. 1-6, which show an embodiment of an apparatus and methods of use for establishing electrical continuity between at least two electrically conductive structures, wherein at least a portion of each structure is electrically conductive.

According to embodiments, apparatus and methods of establishing electrical continuity between at least two electrically conductive structures, wherein at least a portion of each electrically conductive structure is electrically conductive, are provided. In some embodiments, the apparatus comprises a flange tab for operably connecting the apparatus to a first of the at least two structures, an electrical lead connector for operably connecting the apparatus to a second of the at least two structures, wherein connecting the apparatus to the at least two electrically conductive structures establishes electrical continuity therebetween. In yet other embodiments, the apparatus may further comprise at least one sealing portion for sealingly engaging the apparatus with the structures while advantageously enhancing operator safety.

Figure 1A:
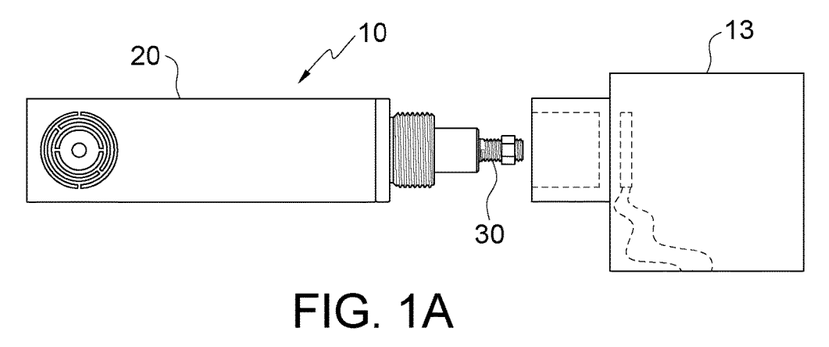
Figure 1B:
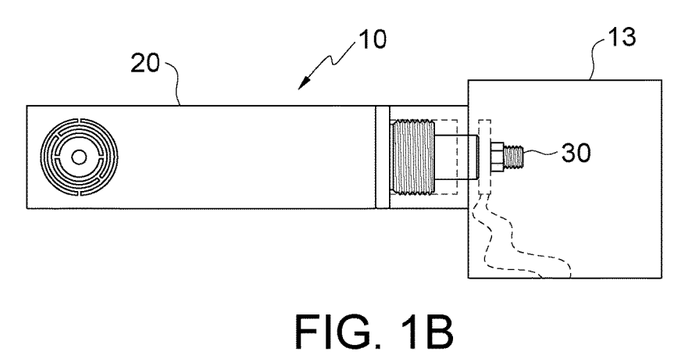

As shown in FIGS. 1A and 1B, present apparatus 10 may comprise a flange tab 20, for operably connecting apparatus 10 to a first of the at least two electrically conductive structures 11 (not shown), and an electrical lead connector 30 for operably connecting apparatus 10 to a second of the at least two structures 13. For example, flange tab 20 may be positioned at or near a first end of apparatus 10, while electrical lead connector 30 may be positioned at or near a second end. As would be appreciated, flange tab 20 and connector 30 may be positioned in any configuration suitable for easily connecting apparatus 10 to first and second structures 11,13. In some embodiments, flange tab 20 may be integrally manufactured with lead connector 30 or may otherwise be operably connected as appropriate (e.g., weld). In other embodiments, flange tab 20 and lead connector 30 may be operably connected to each other by an electrically conductive portion of apparatus 10 positioned between flange tab 20 and lead connector 30 (e.g. sealing portion 40, as will be described).

According to embodiments, flange tab 20 may be manufactured from any electrically conductive materials known in the art. For example, flange tab 20 may be manufactured from steel, copper, aluminum, alloys, or a combination thereof. In some embodiments, flange tab 20 may be substantially rectangular in shape, providing a thin, elongate portion of apparatus 10, although any size and shape suitable for ease of connecting apparatus 10 to first and second structures 11,13.

Figure 2:
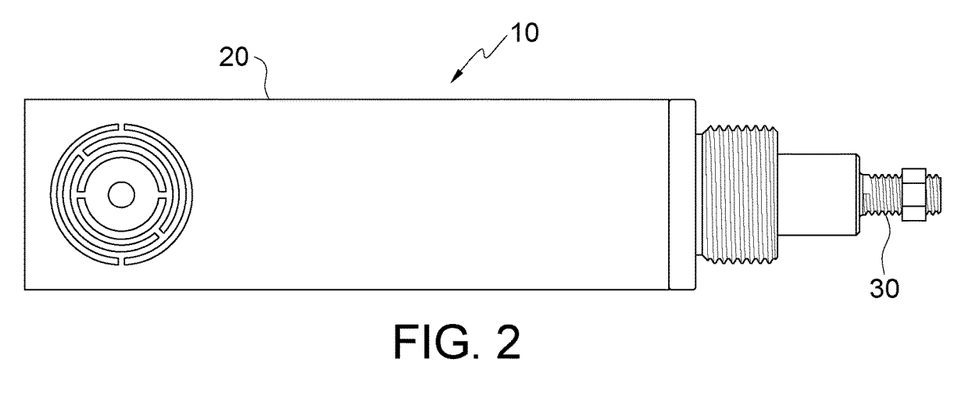
FIG. 2 is a magnified side view of the apparatus as shown in FIG. 1A, according to embodiments.

Having regard to FIG. 2, flange tab 20 may comprise a first end 21, a second end 23, and at least one aperture 22 defining a sidewall 24 (FIG. 3A,3B), positioned between first and second ends 21,23. In some embodiments, as desired, aperture 22 may be positioned at or near the first end 21 of flange tab 20, providing easier connection to the first structure 11 (not shown). Aperture 22 may be configured for slidably receiving the electrically conductive portion of the first structure 11 and may permit conduction of electricity therebetween. Advantageously, as will be described, the size and shape of aperture 22 may be selectively modified in order to accommodate various sizes and shapes of electrically conductive portions of first structure 11. That is, operator may readily adjust the size of aperture 22 on site, as required, in order to connect apparatus 10 to structure 11. Although aperture 22 is shown to be substantially circular in cross-section, any size and shape suitable for connection of apparatus 10 to first structure 11 is contemplated.

Figure 3A:
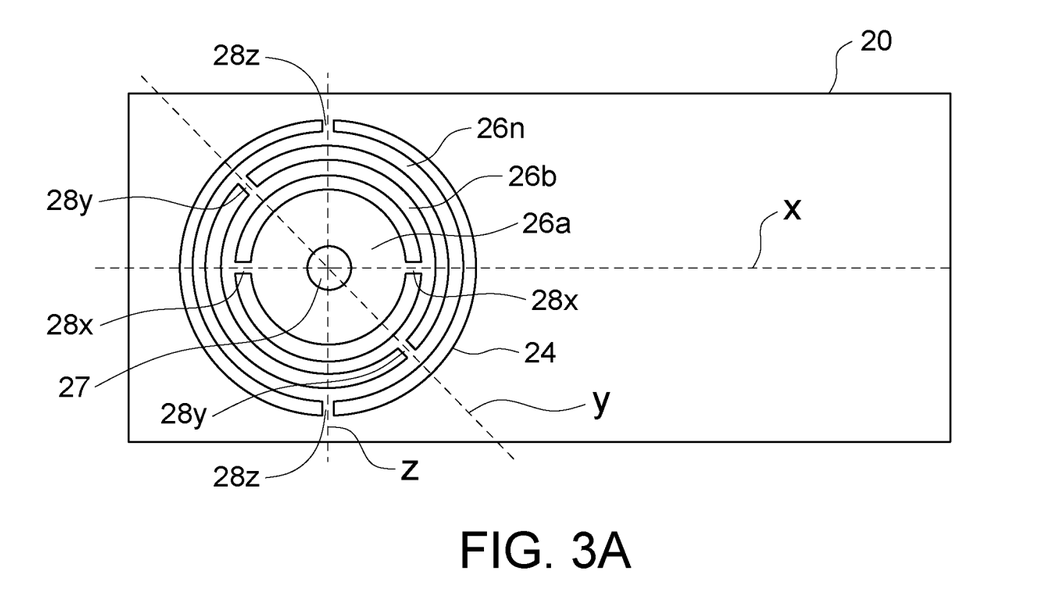
Figure 3B:
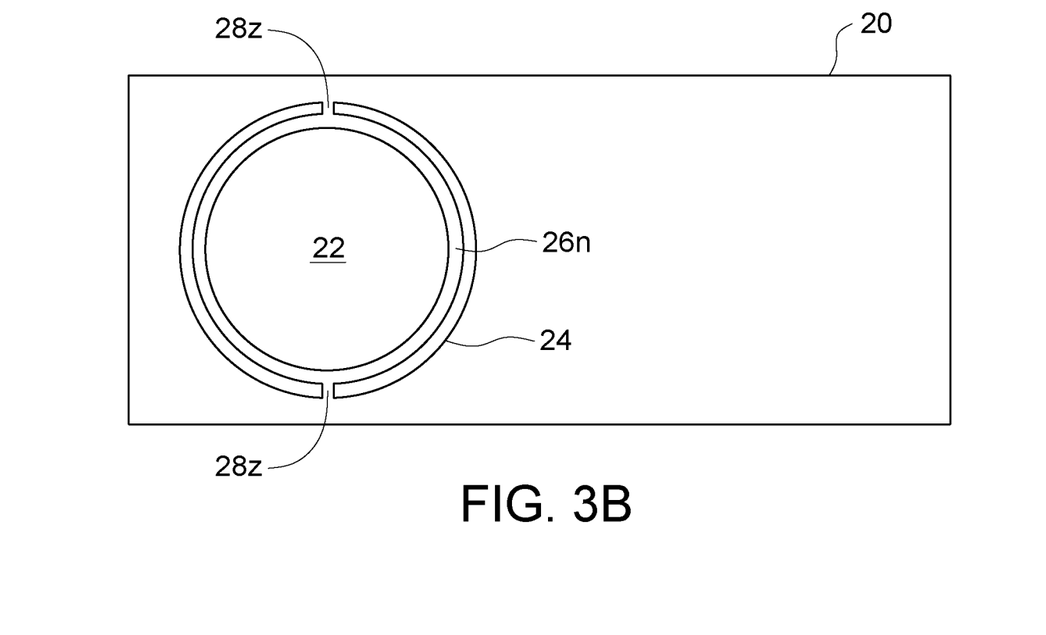
Figure 4A:
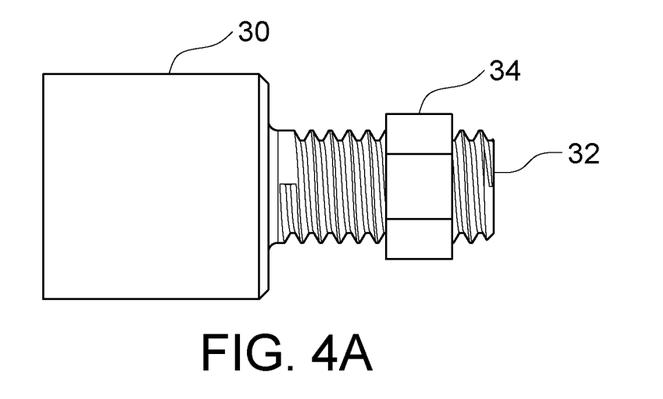
Figure 4B:
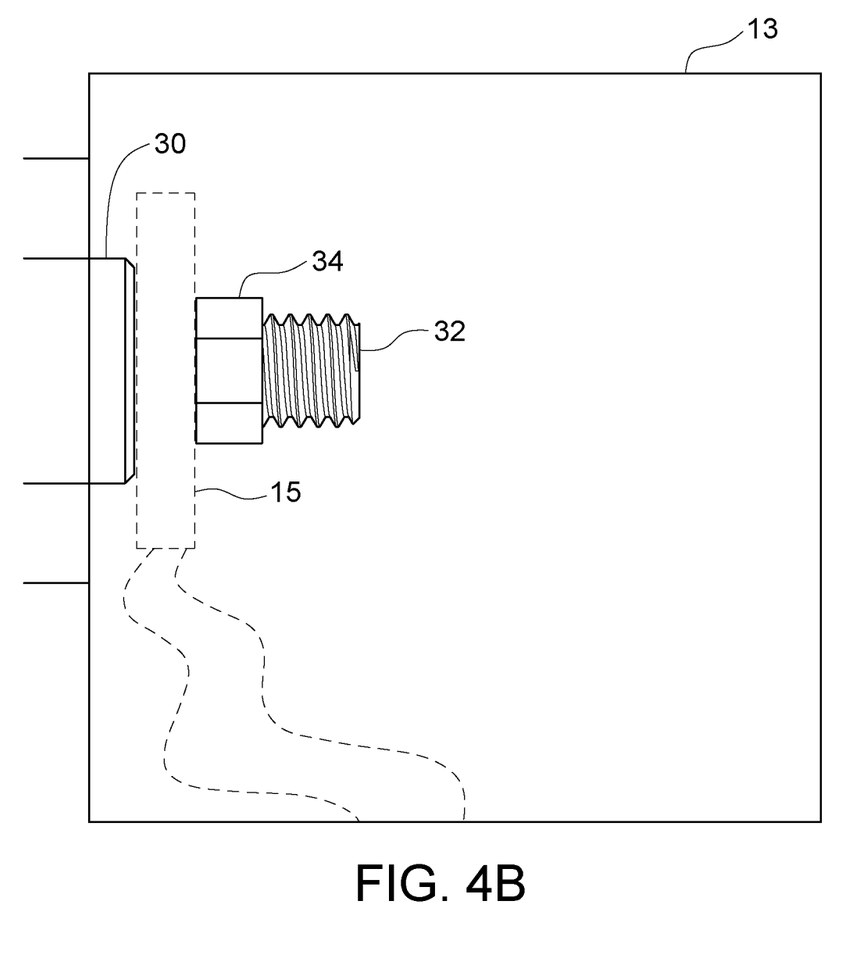
Figure 5A:
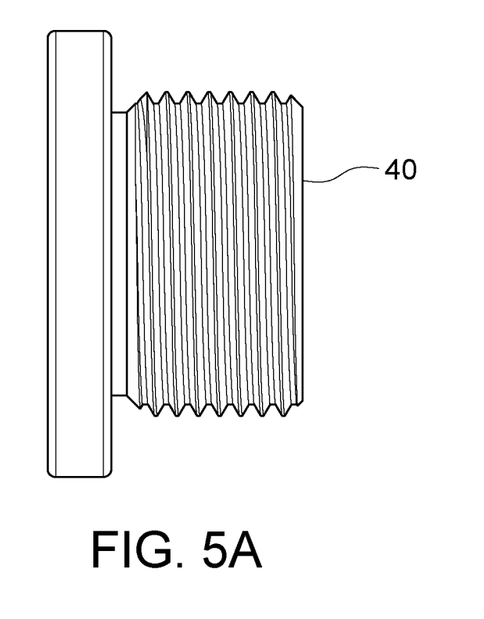
Figure 5B:
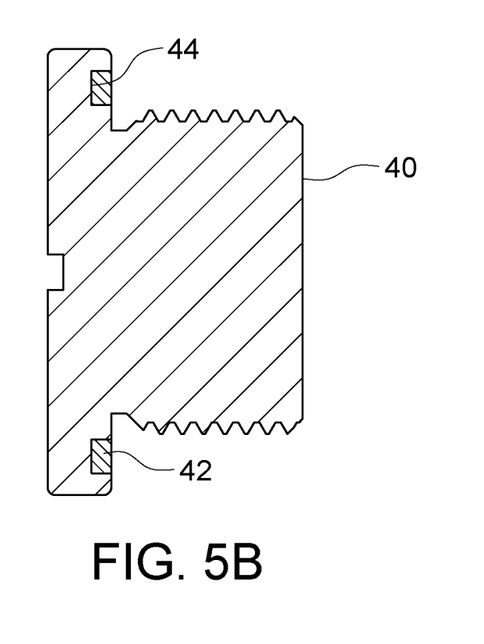
Figure 5C:
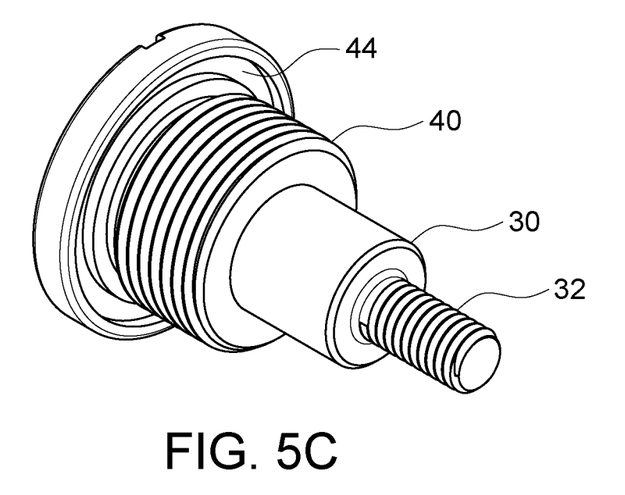

Having regard to FIGS. 3A and 3B, flange tab 20 may further comprise at least two concentric discs 26 removably mounted in series within the aperture 22. The at least two concentric discs 26 may have increasing diameters as the discs 26 progress from a central disc 26a towards an outer disc 26n, the outer disc 26n being adjacent sidewall 24 of aperture 22. For example, the diameter of each disc 26a, 26b, . . . 26n may be sized so as to correspond to industry standards required to connect the apparatus 10 to first structure 11 (e.g., bolts, pipes, or other electrically conductive portions of first structure 11). At least a portion of each disc 26a, 26b, . . . 26n may be manufactured from electrically conductive materials (e.g., steel, copper, aluminum, alloys, or combinations thereof) so as to conduct electricity between flange tab 20 and first structure 11. Alternatively, at least a portion of discs 26 may be manufactured from any shearable or separable material, e.g., plastic. Although discs 26a, 26b, . . . 26n are shown to be substantially circular in cross-section, any size and shape suitable for connection of flange tab 20 of apparatus 10 to first structure 11 is contemplated.

In some embodiments, one of the at least two concentric discs 26a may be centrally disposed within aperture 22. Central disc 26a may form at least one protrusion 27 which, when gripped by operator intending to selectively remove one or more discs 26a, 26b, . . . 26n, may be torqued or otherwise manipulated to cause rotation and/or removal of the selected one or more discs 26a, 26b, . . . 26n.

In some embodiments, each of the at least two concentric discs 26a, 26b, . . . 26n, may comprise a means for mechanically disconnecting one or more of the discs 26 from the other adjoining discs and/or from sidewall 24 of aperture 22 (effectively removing disc 26 from apparatus 10). In some embodiments, at least a portion of the mechanical disconnection means may be manufactured from electrically conductive materials (e.g., steel, copper, aluminum, alloys, or combinations thereof) so as to conduct electricity between electrically conductive portion of first structure 11 and each disc 26 and/or sidewall 24 of aperture 22. Alternatively, at least a portion of the mechanical disconnection means may be manufactured from any shearable or separable material, e.g., plastic. In some embodiments, the mechanical disconnection means may be integrally formed with apparatus 10, i.e., the mechanical disconnection means may be welded or formed by injection moulding, laser cutting, and the like, as desired. Although specific mechanical disconnection means are described herein for explanatory purposes, means for disconnecting the discs 26a, 26b, . . . 26n may be any appropriate disconnection means as known in the art.

Having further regard to FIGS. 3A and 3B, in some embodiments, apparatus 10 may comprise at least two mechanical connectors 28 forming pairs, each pair of at least two connectors 28 corresponding to at least one disc 26a, 26b, . . . 26n, wherein disconnection of a pair of mechanical connectors 28 serves to remove a disc 26a, 26b, . . . 26n from apparatus 10. In some embodiments, each pair of mechanical connectors 28 may be diametrically opposed about a corresponding disc 26, and aligned along at least one axis (e.g., axis x, y, z as shown in FIG. 3A). For example, a first pair of opposed connectors 28x may be aligned along a first axis x, a second pair of opposed connectors 28y may be aligned along a second axis y, and a third pair of opposed connectors 28z may be aligned along a third axis z. Each axes x, y, z may differ one from the other. In use, rotation of at least one disc 26 (e.g., via gripping and applying torque to protrusion 27) about at least one axis x, y, z causes the corresponding pair of connectors 28 to be sheared, permitting at least one disc 26 to be removed from apparatus 10.

Advantageously, aligning each pair of opposed connectors 28 along a different axis x, y, z from other connectors 28 allows for independent selection of the disc 26 to be removed. More specifically, having regard to FIG. 3A, to remove disc 26a, torque may be applied (i.e., via protrusion 27) to rotate disc 26a about axis x until connectors 28x are sheared, releasing disc 26a from aperture 22. Similarly, to remove disc 26b (which may or may not also include 26a), torque may be applied (i.e., via protrusion 27) to rotate disc 26b about axis y until connectors 28y are sheared, releasing disc 26b from aperture 22, and so on. Having specific regard to FIG. 3B, discs 26a and 26b are shown to be removed, while 26n remains in place. For clarity, in order to select and remove any one or more of the discs 26, operator need only apply torque along the desired axis x, y, z to select and remove said disc(s) 26. For example, depending upon the particular disc(s) to be removed (i.e., depending upon the desired diameter of aperture 22), operator may rotate one or more disc(s) 26 about one or more axes. For example, if desired, operator need only apply torque about one axis x, y, z (i.e., via protrusion 27) to remove the selected disc(s) 26 and any smaller disc(s) 26 concentrically disposed therein.

According to embodiments, as above, apparatus 10 comprises at least one lead connector 30 for connecting apparatus 10 to the second structure 13. For example, having regard to FIGS. 4A and 4B, the electrically conductive portion of second structure 13 may comprise at least one electrical lead 15, the electrical lead 15 being secured (i.e., electrically connected) to lead connector 30. That is, lead connector 30 may be configured for simple, convenient connection of apparatus 10 to second structure 13 (e.g., where second structure 13 comprises lead 15, electrical connection may be readily achieved by securing lead 15 to connector 30). For example, in some embodiments, lead connector 30 may form a substantially cylindrical bolt 32 and corresponding nut 34, for securing electrical lead 15 between nut 34 and lead connector 30. Advantageously, as would be appreciated, use of single nut 34 enables easy and convenient securing and connection between electrical lead 15 and connector 30 of apparatus 10 (e.g., eliminating the need for additional nuts, componentry, or tools as known in the art). In some embodiments, bolt 32 may be straight and not tapered. In other embodiments, bolt 32 may comprise a plug stop (not labeled), wherein electrical lead 15 may be secured between the plug stop and nut 34. Advantageously, the plug stop may be located so as to conveniently position electrical lead 15 as desired, when secured by nut 34. It is contemplated that any means for readily securing lead connector 30 of apparatus 10 to second structure 13 is contemplated.

According to embodiments, apparatus 10 may further form at least one means for sealingly engaging apparatus 10 with at least one of first and second structures 11,13, said means advantageously also enhancing operator safety. For example, having regard to FIGS. 5A, 5B, and 5C, apparatus 10 may comprise a sealing portion 40. Sealing portion 40 may be centrally disposed about apparatus 10, i.e., positioned between flange tab 20 and lead connector 30, mounted around flange tab 20 or lead connector 30, or as otherwise suitable in the art. Some or all of sealing portion 40 may be manufactured from electrically conductive materials (e.g., steel, copper, aluminum, alloys, or combinations thereof), or any other suitable material, so that electricity may be continuously conducted between flange tab 20 and lead connector 30.

Figure 6:
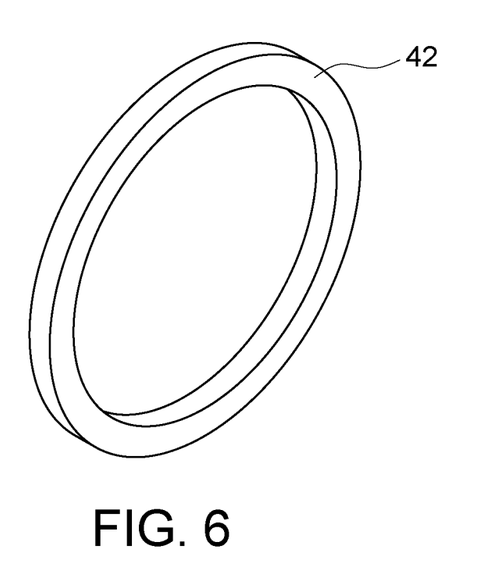
FIG. 6 shows a magnified perspective side view of an annular seal, according to embodiments.

In some embodiments, sealing portion 40 may comprise at least one annular seal 42 (e.g., O-ring; FIG. 6) disposed about apparatus 10 so as to provide a sealed, i.e., waterproof, engagement between apparatus 10 and at least one of structures 11,13. In other embodiments, sealing portion 40 may form at least one annular groove 44, for receiving and retaining the at least one annular seal 42. Advantageously, sealing portion 40 may further serve to strengthen the engagement between apparatus 10 and at least one structure 11,13 while also enhancing safety of apparatus 10. For example, sealing portion 40 may serve to prevent apparatus 10 from inadvertently disengaging from the at least one structure 11,13 (e.g., upon explosion, or other dangerous electrical event). In such embodiments, sealing portion 40 may threadably engage at least one of structures 11,13. In some embodiments, the threading of sealing portion 40 may be straight and not tapered.

According to embodiments, methods are provided for establishing electrical continuity between at least two electrically conductive structures 11,13, wherein at least a portion of each at least two electrically conductive structure 11,13 is electrically conductive. In some embodiment, the methods comprise: providing apparatus 10 having a flange tab 20 for operably connecting apparatus 10 to a first of the at least two structures 11,13, flange tab 20 forming at least one aperture 22 having at least two concentric disc(s) 26 removably mounted therein, and electrical lead connector 30 for operably connecting apparatus 10 to second of the at least two structures 13; selecting and removing at least one of the concentric disc(s) 26 and slidably receiving the electrically conductive portion of first of the at least two structures 11 within aperture 22; securing electrical lead connector 30 to the electrically conductive portion (e.g., 15) of second of the at least two structures 13, wherein, connection of apparatus 11 to first and second at least two structures 11,13 establishes electrical continuity therebetween.

In some embodiments, selecting and removing at least one concentric disc(s) 26 may further comprise rotating the at least one disc(s) 26 about an axis x, y, z. Selecting and removing at least one concentric disc(s) 26 may serve to selectively increase the diameter of aperture 22. Operator will understand which axis x, y, z to rotate the at least one disc(s) 26 about to remove his or her selected disc(s) 26 and increase the diameter of aperture 22 as desired.

In some embodiments, securing lead connector 30 to the electrically conductive portion (e.g., 15) of second of the at least two structures 13 may further comprise positioning the electrically conductive portion about bolt 32 of lead connector 30 and threadably engaging nut 34 to bolt 32 for securing the electrically conductive portion to lead connector 30.

In some embodiments, present methods may comprise providing sealing portion 40 and sealingly engaging sealing portion 40 with at least one of at least two structures 11,13. Sealing engagement may further comprise threadably engaging sealing portion 40 with at least one of at least two structures 11,13.

In summary, an apparatus is provided for establishing electrical continuity between at least two electrically conductive structures, the at least two electrically conductive structures each having an electrically conductive portion, the apparatus comprising: a flange tab for operably connecting the apparatus to a first of the at least two structures, the flange tab comprising a first end, a second end, and at least one aperture for connecting the apparatus to the electrically conductive portion of the first of the at least two structures, the aperture being positioned between the first and second end and defining a sidewall having a diameter, at least two concentric discs removably mounted in series within the aperture, the at least two concentric discs increasing in diameter as the discs progress from a centre disc towards an outer disc adjacent the sidewall of the aperture, an electrical lead connector for operably connecting the apparatus to a second of the at least two structures, wherein connection of the apparatus to the first and second of the at least two structures establishes electrical continuity therebetween.

In some embodiments, each of the at least two concentric discs may comprise at least one mechanical connector.

In some embodiments, each of the at least two concentric discs may comprise at least two diametrically opposed mechanical connectors aligned on at least one axis.

In some embodiments, each of the at least two concentric discs may be rotatable about one of the at least one axis, wherein rotation of a disc disconnects the opposed mechanical connectors and permits removal of the disc from the apparatus.

In some embodiments, the electrically conductive portion of the second of the at least two structures may comprise at least one electrical lead and the electrical lead connector may be configured to securely receive the at least one electrical lead.

In some embodiments, the electrical lead connector may form at least one bolt for threadably receiving at least one nut to secure the at least one electrical lead to the electrical lead connector.

In some embodiments, the apparatus may further comprise at least one sealing portion for sealingly engaging the apparatus with at least one of the first and second of the at least two structures.

In some embodiments, the sealing portion may comprise at least one annular seal.

In some embodiments, the sealing portion may form at least one annular groove for receiving at least one annular seal.

A method is also provided for establishing electrical continuity between at least two electrically conductive structures, the at least two electrically conductive structures each having an electrically conductive portion, the method comprising: providing an apparatus having: a flange tab for operably connecting the apparatus to a first of the at least two structures, the flange tab forming at least one aperture having at least two concentric discs removably mounted therein, and an electrical lead connector for operably connecting the apparatus to a second of the at least two structures, selecting and removing at least one of the concentric discs and slidably receiving the electrically conductive portion of the first of the at least two structures within the aperture, securing the electrical lead connector to the electrically conductive portion of the second of the at least two structures, wherein, connection of the apparatus to the first and second of the at least two structures establishes electrical continuity therebetween.

In some embodiments, the selecting and removing at least one of the concentric disc(s) may comprise rotating the at least one of the concentric discs about an axis.

In some embodiments, the selecting and removing at least one of the concentric disc(s) may serve to selectively increase the diameter of aperture.

In some embodiments, the securing the electrical lead connector to the electrically conductive portion of the second of the at least two structures may comprise: positioning the electrically conductive portion about a bolt portion of the lead connector, and threadably engaging a nut to the bolt for securing the electrically conductive portion to the lead connector.

In some embodiments, the method may further comprise providing a sealing portion and sealingly engaging the sealing portion with the at least one of the at least two structures.

In some embodiments, the sealing engagement may comprise threadably engaging the sealing portion with the at least one of the at least two structures.

Although a few embodiments have been shown and described, it will be appreciated by those skilled in the art that various changes and modifications can be made to these embodiments without changing or departing from their scope, intent, or functionality. The terms and expressions used in the preceding specification have been used herein as terms of description and not of limitation, and there is no intention in the use of such terms and expressions of excluding equivalents of the features shown and the described portions thereof.

I claim:

1. An apparatus for establishing electrical continuity between at least two electrically conductive structures, the at least two electrically conductive structures each having an electrically conductive portion, the apparatus comprising:
    a flange tab for operably connecting the apparatus to a first of the at least two structures, the flange tab comprising a first end, a second end, and at least one aperture for connecting the apparatus to the electrically conductive portion of the first of the at least two structures, the aperture being positioned between the first and second end and defining a sidewall having a diameter,
    at least two concentric discs removably mounted in series within the aperture, the at least two concentric discs increasing in diameter as the discs progress from a centre disc towards an outer disc adjacent the sidewall of the aperture,
    an electrical lead connector for operably connecting the apparatus to a second of the at least two structures,
    wherein connection of the apparatus to the first and second of the at least two structures establishes electrical continuity therebetween.

2. The apparatus of claim 1, wherein each of the at least two concentric discs comprise at least one mechanical connector.

3. The apparatus of claim 2, wherein each of the at least two concentric discs comprise at least two diametrically opposed mechanical connectors aligned on at least one axis.

4. The apparatus of claim 3, wherein each of the at least two concentric discs is rotatable about one of the at least one axis, wherein rotation of a disc disconnects the opposed mechanical connectors and permits removal of the disc from the apparatus.

5. The apparatus of claim 1, wherein the electrically conductive portion of the second of the at least two structures comprises at least one electrical lead and the electrical lead connector is configured to securely receive the at least one electrical lead.

6. The apparatus of claim 5, wherein the electrical lead connector forms at least one bolt for threadably receiving at least one nut to secure the at least one electrical lead to the electrical lead connector.

7. The apparatus of claim 1, wherein the apparatus further comprises at least one sealing portion for sealingly engaging the apparatus with at least one of the first and second of the at least two structures.

8. The apparatus of claim 7, wherein the sealing portion comprises at least one annular seal.

9. The apparatus of claim 7, wherein the sealing portion forms at least one annular groove for receiving at least one annular seal.

10. A method for establishing electrical continuity between at least two electrically conductive structures, the at least two electrically conductive structures each having an electrically conductive portion, the method comprising:
    providing an apparatus having:
        a flange tab for operably connecting the apparatus to a first of the at least two structures, the flange tab forming at least one aperture having at least two concentric discs removably mounted therein, and
        an electrical lead connector for operably connecting the apparatus to a second of the at least two structures,
    selecting and removing at least one of the concentric discs and slidably receiving the electrically conductive portion of the first of the at least two structures within the aperture,
    securing the electrical lead connector to the electrically conductive portion of the second of the at least two structures, wherein, connection of the apparatus to the first and second of the at least two structures establishes electrical continuity therebetween.

11. The method of claim 10, wherein the selecting and removing at least one of the concentric disc(s) comprises rotating the at least one of the concentric discs about an axis.

12. The method of claim 10, wherein the selecting and removing at least one of the concentric disc(s) serves to selectively increase the diameter of aperture.

13. The method of claim 11, wherein the securing the electrical lead connector to the electrically conductive portion of the second of the at least two structures comprises:
   positioning the electrically conductive portion about a bolt portion of the lead connector, and
   threadably engaging a nut to the bolt for securing the electrically conductive portion to the lead connector.

14. The method of claim 10, further comprising providing a sealing portion and sealingly engaging the sealing portion with the at least one of the at least two structures.

15. The method of claim 14, wherein the sealing engagement comprises threadably engaging the sealing portion with the at least one of the at least two structures.

* * * * *